March 13, 1934.　　　　R. D. LACOE　　　　1,950,944
DIESEL TYPE ENGINE
Filed June 28, 1929　　　2 Sheets-Sheet 1
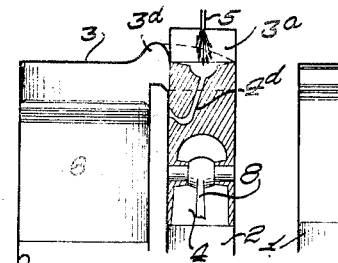
FIG. 4　　FIG. 5
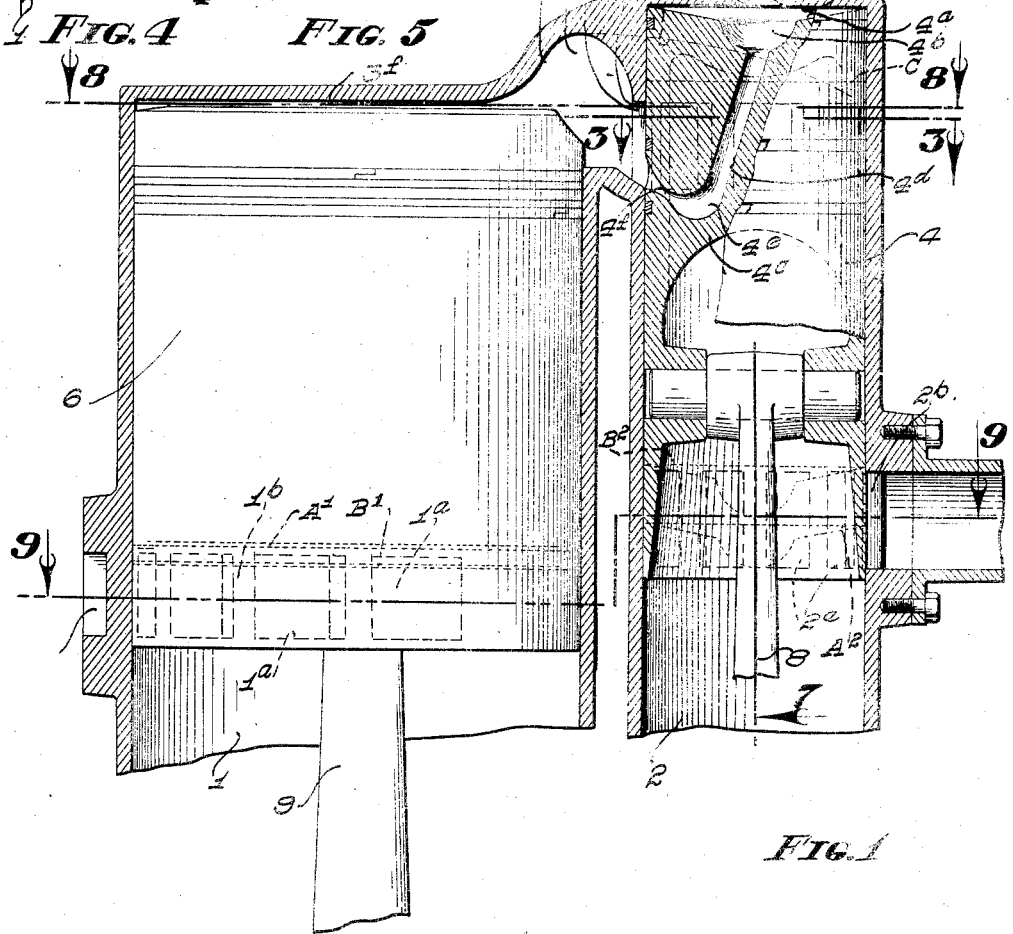
FIG. 1
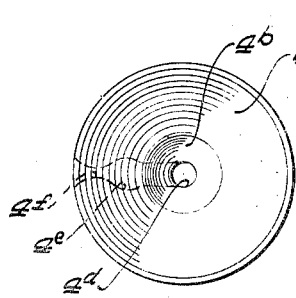
FIG. 2
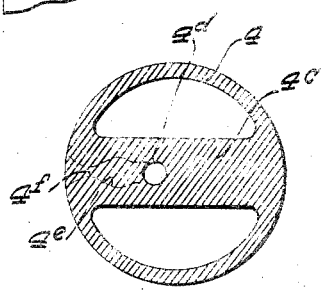
FIG. 3
INVENTOR.
RALPH D. LACOE
BY
A. B. Bowman
ATTORNEY.

March 13, 1934.  R. D. LACOE  1,950,944
DIESEL TYPE ENGINE
Filed June 28, 1929   2 Sheets-Sheet 2
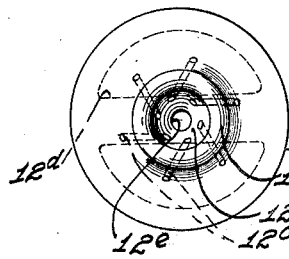
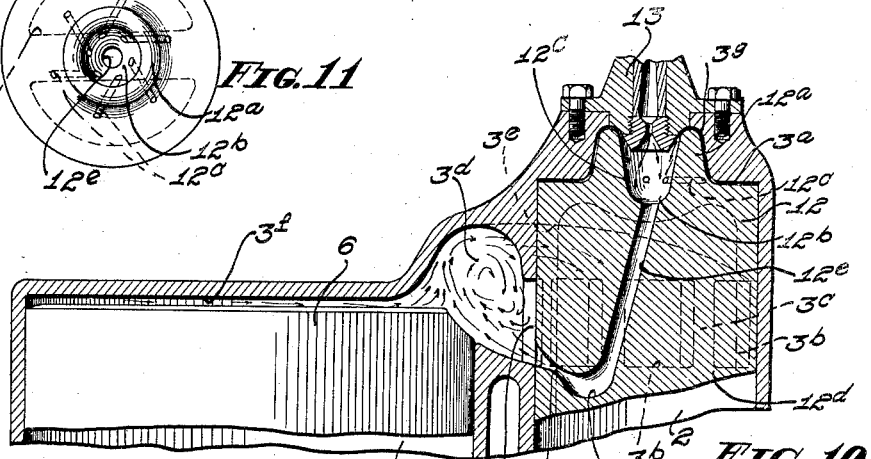
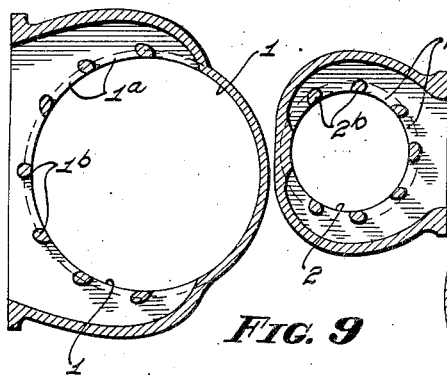
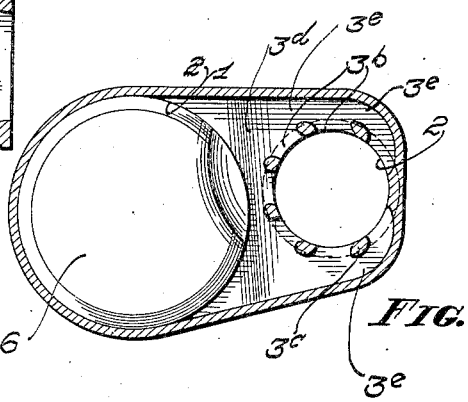
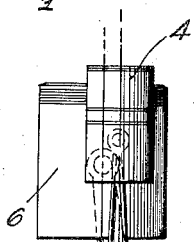
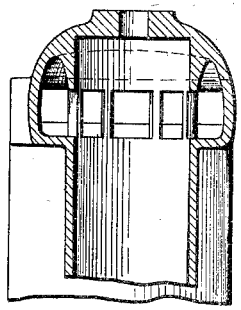
INVENTOR.
RALPH D. LACOE
BY
ATTORNEY Patented Mar. 13, 1934

1,950,944

UNITED STATES PATENT OFFICE 1,950,944

DIESEL TYPE ENGINE

Ralph D. Lacoe, San Diego, Calif.

Application June 28, 1929, Serial No. 374,506

2 Claims. (Cl. 123—33)

My invention relates to two-cycle engines, more particularly to two-cycle engines of the Diesel or mixed-cycle type, and the objects of my invention are: First, to provide an internal combustion engine of this class which may be built extremely light for the power it develops, thereby facilitating its use as an aircraft engine or for other vehicle engines where lightness is essential; second, to provide an internal combustion engine of this class which is capable of running efficiently at high speed, thereby enabling the engine to be compact for its power output; third, to provide an internal combustion engine of the two-cycle type in which the exhaust ports are caused to open and close in advance of the intake ports, thereby greatly reducing the fuel mixture or scavaging air losses common to the conventional two-cycle engine; fourth, to provide an internal combustion engine of the Diesel type in which double ignition and double combustion takes place, the first ignition and combustion being used principally to speed the second ignition and rate of combustion following therefrom; fifth, to provide an internal combustion engine of the Diesel type in which partial combustion of a rich fuel mixture cracks the fuel and raises the temperature of said fuel in order that when said fuel is brought in contact with air in a combustion chamber combustion is greatly facilitated; sixth, to provide an internal combustion engine of the Diesel type in which the time of combustion is so reduced that although the engine is running at high speed, combustion need start only a few degrees before top center and yet efficiently utilize the latent energy of the fuel mixture; seventh, to provide an internal combustion engine of the Diesel type in which the detonation and pre-ignition effects common to high-speed Diesel engines are localized and reduced to a minimum so as to greatly reduce the weight and strength of material formerly necessary to withstand the excessive pressure resulting from said detonation and pre-ignition effects; eighth, to provide an internal combustion engine of this class which combines the efficient scavaging of a four-cycle engine with the simplicity of a two-cycle engine; and ninth, to provide on a whole a novelly constructed Diesel engine of this class which is extremely simple of construction proportional to its functions, durable, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a fragmentary transverse sectional view of a power unit of an engine embodying my invention; Fig. 2 is a plan view of the minor piston; Fig. 3 is a sectional view of said piston through 3—3 of Fig. 1; Figs. 4 and 5 are diagrammatical views of my engine, illustrating the operation thereof; Fig. 6 is another diagrammatical view thereof showing the relationship of the pistons to the crankshaft; Fig. 7 is a reduced sectional view through 7—7 of Fig. 1, with the pistons and injector removed; Fig. 8 is a reduced transverse sectional view thereof through 8—8 of Fig. 1, with the minor piston removed; Fig. 9 is another transverse sectional view through 9—9 of Fig. 1, with the pistons removed; Fig. 10 is a fragmentary sectional view similar to Fig. 1 of a slight modification embodying my invention; and Fig. 11 is a plan view of the minor piston which constitutes a part of said modification.

Major cylinder 1, minor cylinder 2, cylinder head 3, minor piston 4, injector 5, major piston 6, crankshaft 7, connecting rods 8 and 9, cranks 10 and 11, modified minor piston 12, and modified injector 13, constitute the principal parts and portions of my internal combustion engine.

A major cylinder 1 and a minor cylinder 2 are provided, which extend in the same direction parallel with each other and connect at their one adjacent end to a common cylinder head 3, which is preferably integral therewith.

Over the minor cylinder 2, the cylinder head 3 forms an extension thereof. The upper portion of said extension terminates in a super-compression chamber 3a. Between the super-compression chamber 3a and the junction between the cylinder and the cylinder head, said cylinder head 3 is provided with a plurality of ports 3b which intersect the extension of the minor cylinder 2. The several ports 3b are separated one from another by webs 3c, the inner surfaces of which form guides for a minor piston 4 adapted to reciprocate in the minor cylinder 2 and the extension thereof formed in the head 3.

The head of the super-compression chamber 3a is substantially flat and is provided with an opening therethrough in which is mounted a fuel injector 5, which is adapted to spray fuel downwardly into the said super-compression chamber. A firing or combustion chamber 3d is formed in the cylinder head 3. The firing chamber 3d includes two spaces 3e in the form of arms which extend around the outside of the extension of the minor cylinder 2 and communicate with said cylinder and with said super-compression chamber through the ports 3b.

The lower margins of the arm-like spaces 3e are substantially flush with the lower margins of the ports 3b. The upper margins of the extended ends of these spaces 3e, that is the ends most removed from the major cylinder 1, are substantially flush with the upper margins of the ports 3b. These spaces 3e increase in height towards the major cylinder 1 and main portion of the firing chamber 3d. The arm-like spaces 3e join each other adjacent and above the side of the major cylinder next to the minor cylinder 2, and form the main portion of the firing or combustion chamber 3d. Thus, the side walls of the super-compression chamber or ignition chamber 3a extend into the firing chamber.

The portion of the head 3 over the major cylinder 1 forms an extension 3f thereof, but said extension is not as high as the one formed over the minor cylinder 2. The firing chamber 3d includes this extension of the major cylinder 1. The major portion of the head of this extionsion 3f is relatively flat and the under surface thereof facing the major cylinder may be brought down as low as the under side of the upper margins of the ports 3b, as shown in Fig. 1. The portion of the head covering the major cylinder 1 adjacent to the main portion of the firing chamber 3d curves upwardly rather abruptly and joins said main portion of the firing chamber, as shown best in Fig. 1.

A major piston 6 is adapted to reciprocate in the major cylinder 1. The position of the piston at top center is such that very little clearance is left between the top of the piston and the flat portion of the extension 3f forming the larger part of the major cylinder head, as shown in Fig. 1.

Positioned in the side walls of the major cylinder 1 is a plurality of intake ports 1a spaced apart one from another by webs 1b which form guides for conducting the piston past said ports. The piston is made long enough so that the skirt thereof always covers the ports 1a when the head of the cylinder is above said ports in order to prevent air from passing through said ports into the crankcase of the engine.

Similarly, a plurality of exhaust ports 2a are formed in the side walls of the minor piston 2. These ports are separated by a plurality of webs 2b which guide the minor piston 4 past the said port. Said minor piston is made long enough so that the exhaust ports are always covered, while the head of said piston is above said port in order that the back pressure which may exist in the exhaust manifold connected with the exhaust ports will not enter the crank case.

The minor piston 4 is joined to a crankshaft 7, through a connecting rod 8 and a crank 10. Similarly, the major piston 6 is joined to the crankshaft 7 by a connecting rod 9 and crank 11, as shown in Fig. 6. As indicated by the center lines drawn in Fig. 6, the axis of the major piston is set to one side of the crankshaft axis so that better leverage is obtained on the power stroke and also to provide a certain lag of the major piston relative to the minor piston. Further lag is obtained by advancing the position of the crank 10 connected to the minor piston in ahead of the crank 11 connected to the major piston. This is done so that the minor piston both covers and uncovers the exhaust ports in advance of the covering and uncovering of the intake ports.

During the down stroke, due to the lead of the minor piston, the relative positions of the two pistons are approximately that indicated by the dotted lines labelled $A_1$ and $A_2$ in Fig. 1. This dotted position shows the exhaust ports well open and the intake ports still closed. In the upward movement or compression stroke of the pistons, the relative positions are indicated by the dotted lines $B_1$ and $B_2$, in Fig. 1. From these, it can be seen that during the compression stroke the difference in levels of the heads of the two pistons is somewhat greater than the difference in levels during the power stroke. Thus, it is possible to arrange the intake ports and exhaust ports so that the exhaust ports will be closed in advance of the intake ports and thereby economize the scavaging air as well as enabling higher compression at the beginning of the compression stroke.

A diametrically extending web 4c joins the side walls and the under side of the top or head portion of the minor piston. The upper surface of the head 4a of the minor piston is made concave and has centered therein a substantially semi-spherical depression 4b. A passage 4d is provided in the bottom of the depression 4b. This passage extends downwardly into the web 4c and towards one side of the minor piston. The bottom of the passage 4d is enlarged, forming a small chamber 4e. An orifice 4f, forming an injector nozzle communicates with the chamber 4e and pierces the side wall of the minor piston facing the main portion of the firing chamber 3d. Said injector nozzle extends upwardly from said chamber 4d. The position of the injector nozzle 4f is such that it is closed by the side walls of the minor cylinder 2 until the top of the piston has almost reached the head of the super-compression chamber 3a, at which position the injector 4f raises above the lower margin of the ports 3b so as to direct the fluids that may pass through the passage 4d and chamber 4e upwardly into the firing chamber 3d.

The operation of my engine is as follows:

Every up-stroke of the major and minor pistons, causes air previously drawn in through the intake ports 1a to be compressed in the firing chamber 3d and in the super-compression chamber 3a, which forms a part of said firing chamber until the minor piston 4 has passed the upper margins of the ports 3b. By the time the minor piston enters the super-compression chamber 3a and separates it from the firing chamber, the air trapped in said super-compression chamber is already under considerable pressure. When the minor piston has reached about the position labelled C in Fig. 1, fuel is injected through the injector 5. The fuel is injected in excess of the amount capable of being used by the minor piston and the super-compression chamber. The excess fuel collects on top of the piston in the depression 4b and along the passage 4d, and in the small chamber 4e. When the compression within the super-compression chamber has reached a sufficient point, combustion takes place, further movement of the piston further compresses the fuel mixture until the nozzle or injector 4f has passed the lower margin of one of the ports 3b and the fuel mixture has a chance to escape into the firing chamber 3d.

Due to the excess fuel in the super-compression chamber, only partial combustion takes place. This causes a cracking of the excess fuel and renders it in a more fit condition for complete and rapid combustion when brought in contact with air in the firing chamber 3d. Thus the super-compression chamber also functions as a fuel preparing chamber, and a partial combustion chamber.

The burning fuel mixture, together with the excess fuel not burned by reason of the insufficient air, is blown out the nozzle 4f at high velocity, with great force, and in a very hot condition. The previously unburned fuel which has been prepared for proper combustion by the action of the super-compression chamber, when it comes in contact with the air in the firing chamber 3d, immediately commences to burn. Due to the force of this as it is shot out, it is rapidly dispersed throughout the compression chamber, and complete mixture takes place practically instantaneously, so that combusiton takes place in practically all portions of the firing chamber at about the same time, thereby reducing the period of combustion to an interval of short duration, a duration short enough to enable the engine to run at a speed comparable with the Otto-cycle engine used in vehicles.

Due to the relatively low pressure in the combustion chamber 3d, before combustion begins and due to the time of combustion being almost at top center, detonation and pre-ignition effect is reduced to a minimum. As shown in the drawings, the minor cylinder and piston are made relatively small so that what detonation and pre-ignition effect that occurs in the super-compression cylinder is confined to a small area and therefore, the deleterious effect thereof is reduced to a minimum.

The detonation and pre-ignition effects occurring in said super-compression cylinder are relieved by the act of injection into said firing chamber.

The modified structure shown in Figs. 10 and 11 is similar to the previously described structure except for the minor piston and the head of the super-compression chamber therefor.

Centered on the head of the minor piston 12 of the modified structure, is an annular ridge 12a. The annular ridge 12a forms at its inner side a well or socket 12b; said socket 12b preferably extends below the normal upper surface of the minor piston 12, as shown in Fig. 10. The base of the ridge 12a is pierced transversely by a plurality of small holes 12c which intersect the side walls of the well or socket 12b, substantially tangential thereto. A diametrically disposed web 12d extends between opposite side walls of the piston and across the under side of the head of the piston 12, as shown in Fig. 10. A passage 12e extends downwardly from the well 12b and forms at its lower end a small chamber 12f. A nozzle or injector orifice 12g communicates between the chamber 12f and the side wall of the piston 12 adjacent the major piston 6. The orifice 12g is so arranged that fluids issuing therefrom are directed upwardly towards the main portion 3d of the firing chamber. Thus, it will be seen that the web 12b, passage 12e, chamber 12f, and nozzle or orifice 12g are similar in construction to the corresponding portions of the first described minor piston 4.

A depression 3g is formed in the head of the super-compression chamber 3a. The side walls of said depression conform substantially to the outer side walls of the ridge 12a, as shown in Fig. 10. An injector 13 is mounted in the depression 3g and is designed to extend part way into the well or socket 12b.

The operation of the modified structure is similar to that of the first described structure. Air is compressed into the firing chamber 3d and super-compression chamber 3a by the action of both the major and minor pistons until said minor piston passes above the upper margins of the ports 3b trapping a portion of the air in the super-compression chamber 3a.

Fuel is injected into the compression chamber from the injector 13 just after the said minor piston 12 has closed the ports 3b. The piston at the beginning of the injection is approximately at the position shown by the dotted lines labelled D in Fig. 10. As in the first described structure, more fuel is injected than can be utilized by the air within the super-compression chamber.

The excess fuel tends to collect on the upper surface of the piston and in the well 12b. Ignition takes place soon after injection. The piston continues to move upwardly against the burning fuel mixture creating a high temperature and pressure. As in the first described structure, only partial combustion takes place in the super-compression chamber, due to the presence of excess fuel. This partial combustion prepares the excess fuel for rapid and complete combustion when it comes in contact with the air in the firing chamber 3d. The fuel mixture and prepared excess fuel is released into the firing chamber at the proper time by the nozzle registering with one of the ports 3b.

The holes 12c create a twirling, turbulent motion of the air within the well 12b, during the compression and combustion within the super-compression chamber. Most of the air in the super-compression chamber, however, passes between the outside of the ridge 12a and the walls of the depression 3e and enters the well 12b at the upper side thereof and in substantially the same direction as the fuel which is being injected, as indicated by the arrows in Fig. 10. This facilitates proper mixture of the air and fuel.

Though I have shown and described a particular construction, combination and arrangement of parts and portions, and a certain modification thereof, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. In an internal combustion engine, a major cylinder, a major piston, a minor cylinder adjacent said major cylinder, a passage connecting said cylinders, a minor piston, a reduced annular portion on the upper end of said minor piston forming a fuel receiving cup, a conforming socket in the head end of said minor cylinder adapted to receive said annular portion, while said minor piston is in its compressing position, a fuel injector extending through said head end into said socket, a channel extending from within said annular portion and terminating in an orifice in the side wall of said minor piston and adapted to communicate with said connecting passage when said minor piston occupies a fully compressing position.

2. An internal combustion engine as claimed in claim 1 in which the wall of said annular portion is pierced by substantially radial holes for allowing passage of gas into said cup for agitating the fuel therein.

RALPH D. LACOE.